United States Patent Office 3,234,287
Patented Feb. 8, 1966

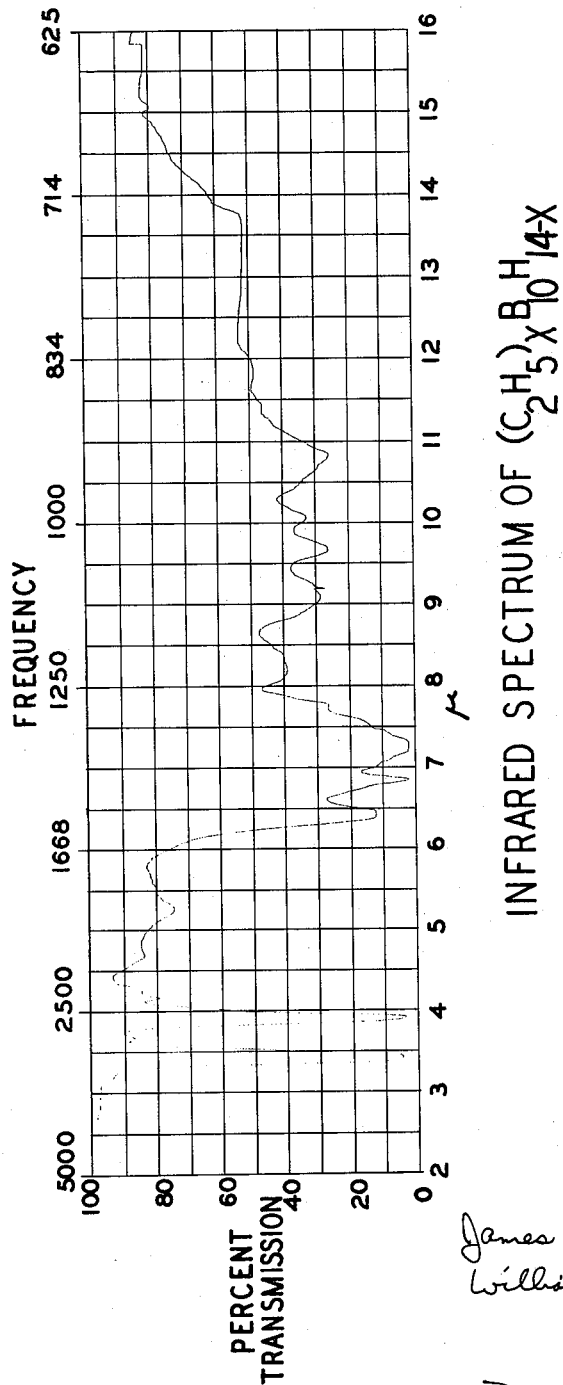

3,234,287
COMPOUNDS PRODUCED FROM DIBORANE
AND UNSATURATED HYDROCARBONS
William H. Schechter, Zelienople, and James D. Klicker, Mars, Pa., assignors, by direct and mesne assignments, to Callery Chemical Company, Pittsburgh, Pa., a corporation of Pennsylvania
Filed Feb. 9, 1956, Ser. No. 564,365
13 Claims. (Cl. 260—606.5)

This application is a continuation-in-part of our copending application Serial No. 402,805, filed January 7, 1954, and now abandoned.

This invention relates to organic compounds containing boron and hydrogen, and it is among its objects to provide a method of making such compounds that is simple, easily practiced and efficient.

The invention is predicated upon our discovery that diborane ($B_2H_6$) will react with unsaturated aliphatic hydrocarbons with production of organic compounds containing high ratios of boron and hydrogen to carbon that offer utility as high energy fuels and for other purposes. The unsaturated aliphatic compounds useful in the practice of the invention are the alkenes, alkines and those containing more than one double bond, typical examples being ethylene ($C_2H_4$), acetylene ($C_2H_2$), propylene ($C_3H_6$), isobutylene ($C_4H_8$) and butadiene ($C_4H_6$). Depending upon the unsaturated hydrocarbon and reaction conditions, various compounds may be produced, examples being boron triethyl, the mono-, di-, tri- and tetra-ethyl diboranes ($R_xB_2H_{6-x}$ where R is an alkyl radical and $x$ is a whole number from 1 to 4 inclusive), as well as compounds and mixtures of compounds containing boron and hydrogen that have not been fully characterized.

In the practice of the invention diborane is reacted with an unsaturated aliphatic hydrocarbon; if desired for any reason, more than one such hydrocarbon may enter into the reaction. The reaction may be effected in static fashion, i.e., in a closed system, but for most purposes continuous flow methods are preferred. In general, reaction conditions are not critical, and the exact temperature and pressure conditions will depend upon such factors as the particular hydrocarbon used, the product desired, the rate of reaction, and related factors.

As exemplifying the invention in further detail, reference will now be made to its various aspects as represented by actual experience. Thus, a mixture of $C_2H_4$ and $B_2H_6$ was heated in a bomb at 100° C. for five hours. Fractionation of the products gave a 38 percent yield of boron triethyl ($BEt_3$). Again, a mixture of $C_2H_4$ and $B_2H_6$ was maintained in a closed system in contact with shavings of Tygon (a clear flexible vinyl type plastic) tubing for 100 hours at room temperature. Fractionation of the product yielded $EtB_2H_5$, $Et_2B_2H_4$, $Et_3B_2H_3$ and $Et_4B_2H_2$.

In a further test, ethylene and diborane were passed in approximately equimolar ratios, using nitrogen as a diluent, through a glass tube packed with steel wool and heated in a furnace to 150° C. The gases reacted almost immediately with deposition of solids in the system. Liquid products of reaction were collected in a Dry Ice trap and constituted approximately 15 percent of the weight of the entering gases. Fractional condensation of the product gave materials which contained boron and active hydrogen (i.e., hydrogen directly attached to a boron atom and releasable by hydrolysis) and flashed in air. The vapor pressures of the liquid products did not correspond to those reported for the ethyl diboranes or boron triethyl.

In the course of the foregoing run it was observed that an exothermic reaction took place at a point outside the furnace where the ethylene and diborane streams were mixing. In a modified run the two streams of gas were passed into a bulb containing an electric heating element that was used to initiate the reaction, the reaction temperature being controlled by an external bath. The products, which contained boron and active hydrogen, were collected in a cold trap. In a series of runs made this way approximately 3.5:1 ratios of ethylene to diborane were used with nitrogen as a diluent. The vapor phase from some of the products was rapidly pumped off after they had been kept at room temperature for about a week, and the products were analyzed for boron and active hydrogen. The yields were about 55 to 60 percent based upon the flow rates of the reactants and the product weight recovered. Typical examples are shown in the following table:

| Run | Reac. Temp., ° C. | Act. H, mgm.a./gm. | B, mgm.a./gm. |
|---|---|---|---|
| A | 117–120 | 14.8 | 14.4 |
| B | 135–137 | 14.1 | 14.3 |
| C | 113–116 | 14.6 | 14.5 |

In the foregoing table and in subsequent references to the boron and active hydrogen content of reaction products the boron and active hydrogen are expressed in milligramatoms per gram (mgm.a./gm.). The active hydrogen is measured as the volume of hydrogen released by complete hydrolysis of the compound. In the case of diborane and diborane derivatives the hydrogen thus released by hydrolysis has a one to one correlation with the active hydrogen content. The active hydrogen and boron contents of the materials of the foregoing table correspond closely to those calculated from tetraethyl diborane. It should be noted that the only previous reaction reported between ethylene and diborane (by D. T. Hurd in 70 J.A.C.S. 2053–5, 1948) produced only boron triethyl and no substituted boranes.

The crude product from another run made in the same way was subjected to vacuum fractional distillation. About 30 percent of the material distilled at a temperature and pressure corresponding to those for boron triethyl. Temperature fluctuations during the distillation of the higher boiling material indicated that the product was decomposing, and the distillation behavior was that which might be expected from an equilibrium mixture of alkylated diboranes. Subsequent work with product made from ethylene and diborane and distilled in a Podbielniak low temperature fractionation still confirmed those conclusions by demonstrating that the material disproportionated during the distillation with the production of monoethyl diborane and diethyl diborane.

In a series of reactions carried out similarly but without using a diluent gas it was found that with 3.5:1 or higher ratios of $C_2H_4$ to $B_2H_6$ only very small quantities of solids were produced and the exit gases contained only traces of boron while the yield of liquid product based on the diborane charge was essentially quantitative. On the other hand, the yields from reactions using lower ratios of ethylene to diborane became progressively lower as the ratio was decreased, and the exit gases contained considerable quantities of boron but in general the active hydrogen and boron content of the products was higher, as was the vapor pressure. Also, with ratios of ethylene to diborane less than 3.5:1 and at higher temperatures the amount of solids formed was increased.

The following table shows how the boron and active hydrogen contents and yields (based on boron content of the exit gases) of the products varies with variation in the molar ratio of the reacting gases and with temperature:

| Molar Ratio $C_2H_4/B_2H_6$ | Reac. Temp., °C. | Yield, percent | Act. H, mgm.a./gm. | B, mgm.a /gm. |
|---|---|---|---|---|
| 6/1 | 150–160 | 100 | 5.0 | 10.1 |
| 3.5/1 | 105–115 | 100 | 15.8 | 14.6 |
| 3/1 | 105–110 | 90 | 20.5 | 16.0 |
| 2.5/1 | 115–120 | 65 | 21.4 | 15.2 |
| 2/1 | 115–125 | 60 | 25.9 | 18.1 |

In the study of the reaction of ethylene and diborane in varying ratios it was found that there is a relatively critical reaction ratio which determines the character of the reaction product. This critical reaction ratio is not clearly defined but occurs at an ethylene-diborane ratio of about 6:1. At ratios of ethylene to diborane above about 6:1 the product obtained is predominantly monomeric, i.e., $B(C_2H_5)_3$. At ratios of ethylene to diborane less than 6:1 the product obtained is predominantly polymeric, i.e., ethyl diboranes or ethyl substituted higher boranes.

Propylene, iso-butylene, and butadiene likewise give liquid products when reacted in the foregoing manner.

It has been found that the reaction temperature varies considerably with the heat transfer characteristics of the apparatus and in general increases substantially in proportion to the flow rates of the reactants. The increase in reaction temperatures at higher flow rates of the reactants makes high flow gas phase reactions very difficult to carry out. The problem of temperature control of this reaction has been solved by carrying out the reaction in solution in the liquid reaction products. In a liquid phase reaction the reaction temperature can be accurately controlled, thus preventing the formation of undesirable solid reaction products which result from the uncontrolled higher temperature reaction.

For many purposes it is preferred to carry out these flow reactions in a packed column provided with a suitable temperature controlling means such as a temperature controlling bath and arranged for introduction of the unsaturated hydrocarbon and the diborane into or adjacent to, the bottom of the column. A liquid takeoff means is provided at the top of the column associated with appropriate cold traps for condensation and collection of highly volatile products, thus providing a refluxing type reactor. Non-condensible gaseous products of reaction may also be taken off from the top of the column.

In another extended run, ethylene and diborane in substantially equimolar ratios were reacted in a packed tube using nitrogen as a diluent. The diborane, ethylene, and nitrogen flow rates were held at 25 cc./min. during the reaction. The packed tube reactor was maintained at a temperature of 150° C. and was operated intermittently for several days for a total reaction time of 57.5 hours. The reaction proceeded smoothly with the production of 105 ml. of liquid product.

This liquid product was subjected to vacuum distillation at room temperature and substantially all of the product recovered as a volatile mixture of ethyl diboranes. The residue from this distillation was then washed with n-pentane and stripped of residual alkyl diboranes and other relatively volatile components in a falling film molecular still. The residue from this distillation was then subjected to a vacuum distillation at $10^{-4}$ mm. Hg. The distillate from this distillation was redistilled and a volatile fraction recovered in a −196° trap. This volatile fraction was examined in the mass spectrometer. Relatively strong mass peaks were observed in the ranges 114–120, 80–92, and 70–78. These data established the presence of alkylated higher boron hydrides in the following amounts: $(C_2H_5)_2B_5H_7$, 5.5%; $C_2H_5B_5H_3$, 5.5%; $C_2H_5B_4H_9$, 8.0%.

The residue from the final distillation was analyzed and found to contain 34.9 mgm.a./gm. boron, and 34.3 mgm.a./gm. carbon (mgm.a.=milligramatoms). This residue was dissolved in $CCl_4$ and an infrared spectrum obtained which is shown in the attached drawing. This infrared spectrum was obtained using a Perkin-Elmer, Model 21, double beam, infrared spectrophotometer. The cell used was fitted with rock salt lenses with 0.2 mm. spacing between the lenses. Compensation was accomplished by inserting in the reference beam an identical cell filled with the solvent ($CCl_4$). The analytical data, i.e., elemental analysis and infrared spectrum, establish clearly that this residue consisted of a mixture of ethyl decaboranes with tetraethyldecaborane being the predominant species.

Experience has shown that the reaction between acetylene and diborane is more vigorously exothermic than that between ethylene and diborane, and tends to give in gas phase reaction a higher proportion of solid products. However, we have found that when the reaction is carried out in the presence of liquid solvents it is more easily controllable and is productive of a higher proportion of desired products containing a high proportion of boron and active hydrogen to carbon. Reaction solvents which have been used with some degree of success include high boiling petroleum ether (115°–154° B.P.), toluene, and dioxane. Petroleum ether is the only one of these solvents which appears to be substantially inert under the reaction conditions. The other solvents have some tendency to react and thus produce a more viscous reaction product. We have also found that alkyl boranes from the ethylene-diborane reaction and the liquid reaction product of this reaction may be used for the same purpose, which affords a useful means of modifying the properties of the product since they appear to enter in the reaction.

In this embodiment of the invention the gaseous reactants may be passed into a body of the solvent, the temperature of which is controlled, or the gaseous reactants and liquid solvent may be flowed through the system conjointly. Where acetylene is the unsaturated hydrocarbon, the reaction should be initiated at about 90° C. when carried out in petroleum ether. When this reaction is carried out in the liquid reaction product of this reaction or in the alkyl boranes produced in the ethylene-diborane reaction the most desirable reaction temperature range appears to be about 40–80° C.

As exemplifying this embodiment of the invention, acetylene was passed into the bottom of a column packed with glass helices, diborane was introduced at a higher level into the column, and a continuous flow of petroleum ether was introduced below the actylene entry. The column was surrounded by an oil bath and all products were taken off from the top with appropriate means for separating and recovering the liquid products from the non-condensable products. At a flow rate of 40 ml./min. of acetylene and diborane and 0.08 ml./min. of petroleum ether of 115°–154° B.P. a crude product was obtained with an active hydrogen and boron content each of about 14 mgm.a./gm. After being pumped off at room temperature about 48 percent of the product remained and had a boron content of 21 mgm.a./gm. and an active hydrogen content of 20 mgm.a./gm.

In view of the high temperature of reaction of the uncontrolled acetylene-diborane reaction it is necessary that the reaction be carried out in the liquid phase substantially as described above. We have found, however, that the reaction product forms a better reaction medium than any solvent which was used. In one typical reaction using the reaction product as the reaction medium a 0.3 gm. sample of the acetylene-diborane reaction product was treated with 1.16 gm. of acetylene and 0.89 gm. of diborane, the gases being added alternately in small portions so that the gas pressure above the liquid was kept at 100 to 300 mm. Hg. The volatile products were removed leaving as a non-volatile product a viscous liquid which contained 28 mgm.a./gm. of boron and 37.8 mgm.a./gm. of active hydrogen. In later runs in which the flow of reactants approached steady state conditions boron and active hydrogen contents on the order of 40 mgm.a./gm. and 50 mgm.a./gm. respectively were obtained.

Similarly, the alkyl borane used for modifying the reaction need not be product of the reaction gases. Thus, 4.6 gm. of ethylene-diborane reaction product containing 19.8 mgm.a./gm. of active hydrogen and 16 mgm.a./gm. of boron was treated with a total of 1.17 gm. of acetylene and 0.849 gm. of diborane, the gases being added to the liquid in small portions so that the gas pressure above the liquid was kept at 100 to 200 mm. Hg. All of the acetylene was added before the diborane addition was started. The volatile portion of the product was removed by pumping leaving a non-volatile product that was a viscous liquid with 29.5 mgm.a./gm. of active hydrogen and 21.4 mgm.a./gm. of boron.

The reaction product may be modified by carrying out the reaction in the presence of alkyl boranes or by reacting both ethylene and acetylene with diborane to produce a mixed reaction product. Thus, in a flow type liquid phase reaction system of the type described above the reaction product may be charged into the packed column and heated to about 80° C., after which the currents of acetylene, ethylene, and diborane are started. In one run the acetylene, ethylene, and diborane, were circulated at rates of 25 ml./min., 25 ml./min., and 32 ml./min., respectively, for a period of 8.2 hours. A liquid reaction product was obtained having an average boron content of 26.0 mgm.a./gm. and an average active hydrogen content of 33.1 mgm.a./gm. In another run the flow rates of acetylene, ethylene, and diborane were 25 ml./min., 25 ml./min., and 50 ml./min., respectively, for 4 hours. The reaction product had average boron and active hydrogen contents of 23.3 mgm.a./gm. and 31.2 mgm.a./gm. respectively and average vapor pressure of 235 m. at 28° C.

In carrying out the acetylene-diboane reaction and the acetylene-ethylene-diborane reaction it proved to be very desirable to carry out the reaction in two separate reaction columns. In the acetylene-diborane reaction the diborane was added to some of the reaction product in the first column to produce a diborane enriched product which was removed from the column. A portion of the product from the first column was then added to the second column where the acetylene was added to produce an acetylene-rich reaction product. The reaction product from the second column was then returned to the first column for the reaction with diborane, and the circulation continued through the two columns in this manner. It was found necessary to hold this reaction to a temperature of less than 45° C.

In the acetylene-ethylene-diborane reaction the two reaction columns were mounted one above the other. The bottom column was used for reacting the reaction product with ethylene and diborane. The top column was used for reacting the reaction product from the bottom column with acetylene and diborane. The bottom column was held, by a suitable bath, to a temperature of 100° C., while the top column was held to a temperature of about 80° C. In this double column arrangement the initial feed rates of ethylene and diborane were 25 ml./min. and 7 ml./min., and the feed rates of acetylene and diborane were 25 ml./min. and 25 ml./min., respectively. The reaction product was that indicated in the first example of this reaction reported above. In subsequent reactions the ethylene-diborane flow rates were adjusted to 25 ml./min. and 25 ml./min., respectively, and the acetylene-diborane flow rates were held to the previously reported value. The reaction product was that reported in the second example of this reaction reported above.

The liquid products which are produced by the above processes (including the specific new compounds formed) are useful as high energy fuels in bipropellant systems. These liquid high energy fuels burn readily with conventional oxidizers, including air and oxygen, and are primarily useful in turbojet, ram jet, and rocket engines. These fuels may be used alone or in mixtures in any proportion with other fuels toward which they are chemically inert, e.g., most ordinary hydrocarbon fuels. These fuels have a high heat of combustion (greater by 10–50% than the best hydrocarbon fuels), and have other desirable fuel properties e.g., large liquidus range and low viscosity. The alkyl substituted higher boranes, such as the ethyl tetraboranes, ethyl pentaboranes, and ethyl decaboranes, are resistant to hydrolysis and to thermal decomposition. The ethyl diboranes are less resistant to hydrolysis and to thermal decomposition but are sufficiently stable to be useful as high energy fuels. In actual tests the method of using the fuels is the same for alkyl diboranes and alkyl higher boranes and mixtures thereof except for the differences in volatility. A sample of the fuel is introduced into the combustion section of a jet test engine, burned with compressed air, and the efficiency of combustion and output of the engine measured. The fuels which were made by the above mentioned processes were all found to burn with an efficiency and energy output superior to the best hydrocarbon fuels.

According to the provisions of the patent statutes, we have explained the principle and mode of practicing our invention and have described what we now consider to represent its best embodiment. However, we desire to have it understood that within the scope of the appended claims, the invention may be practiced otherwise than as specifically described.

Having thus described our invention what we desire to claim and secure by Letters Patent is:

1. A method of making an organic compound containing boron and active hydrogen comprising contacting and reacting diborane and acetylene in a molar ratio of acetylene to diborane of less than 6:1 in one reactor in a liquid diborane aliphatic hydrocarbon reaction product, discharging the product of reaction to a second reactor, contacting and reacting diborane and ethylene in a molar ratio of ethylene to diborane of less than 6:1 in said second reactor in said last named reaction product, recovering the product of reaction and recirculating a portion of the same to said one reactor to provide a reaction medium for said first named reaction.

2. A method according to claim 1 in which the diborane-acetylene reaction is maintained at a temperature not in excess of 80% C. and the ethylene-diborane reaction is maintained at a temperature of about 100% C.

3. A method of preparing an organic boron-containing compound that contains active hydrogen which comprises contacting and reacting an aliphatic hydrocarbon that contains at least one double bond and diborane, in a molar ratio of said hydrocarbon to said diborane of less than 6 to 1, in a substantially inert solvent at a temperature below that at which there is an appreciable formation of solids, and recovering the resulting product.

4. A method of preparing an organic boron-containing compound that contains active hydrogen which comprises contacting and reacting an aliphatic hydrocarbon that contains at least one double bond and diborane in a molar ratio of said hydrocarbon to said diborane of less than 6 to 1, in a diborane-aliphatic unsaturated hydrocarbon liquid reaction product at a temperature below that at which there is an appreciable formation of solids, and recovering the resulting product.

5. A method of preparing an organic boron-containing compound that contains active hydrogen which comprises contacting and reacting diborane and a hydrocarbon selected from the group consisting of alkenes and alkadienes, in a molar ratio of said hydrocarbon to said diborane of less than 6:1, in a substantially inert solvent at a temperature below that at which there is an appreciable formation of solids, and recovering the resulting product.

6. A method of preparing an organic boron-containing compound that contains active hydrogen which comprises contacting and reacting diborane and a hydrocarbon selected from the group consisting of alkenes and alkadienes in a molar ratio of said hydrocarbon to diborane of less than 6:1, in a liquid reaction product of diborane and said hydrocarbon at a temperature below that at which there is an appreciable formation of solids, and recovering the resulting product.

7. A method in accordance with claim 6 in which said hydrocarbon is a lower alkene and said temperature is not in excess of 150° C.

8. A method in accordance with claim 7 in which said lower alkene is ethylene.

9. A method of preparing an organic boron-containing compound that contains active hydrogen which comprises contacting and reacting an aliphatic hydrocarbon that contains at least one double bond and diborane in a molar ratio of hydrocarbon to diborane of less than 6 to 1, recovering the resulting product from said reaction mixture, and then effecting further reaction between said recovered product and diborane.

10. A method of preparing an organic boron-containing compound that contains active hydrogen which comprises contacting and reacting diborane with a liquid reaction produce of an aliphatic unsaturated hydrocarbon and diborane, in which said hydrocarbon was reacted with said diborane in a molar ratio of less than 6 to 1, in a first reaction zone, removing a portion of the resulting product from said first reaction zone and introducing it into a second reaction zone, contacting and reacting an aliphatic hydrocarbon that contains at least one double bond with said product in said second zone, and removing from second reaction zone the product of the reaction therein and cycling it to said first reaction zone.

11. A method in accordance with claim 10 in which reaction in each of said zones is conducted at a temperature that does not exceed about 150° C.

12. A method of preparing an organic boron-containing compound that contains active hydrogen which comprises contacting and reacting diborane and a hydrocarbon selected from the group consisting of alkenes and alkadienes in a molar ratio of said hydrocarbon to diborane of less than 6:1, recovering the resulting product from said reaction mixture, and then effecting further reaction between said recovered product and diborane.

13. A method of producing a trialkyl borane which comprises reacting an olefin with diborane in a molar ratio of at least 6 to 1 in a preformed liquid heel consisting essentially of a trialkylborane.

References Cited by the Examiner
UNITED STATES PATENTS 3,164,639  1/1965  Weilmuenster et al. _ 260—606.5

OTHER REFERENCES

Hurd: Chemistry of the Hydrides, John Wiley and Sons, Inc., New York, 1952, p. 88.

Hurd: Journal American Chem. Society, vol. 70 (1948), pages 2053 to 2055.

Schlesinger et al.: Chem. Reviews, vol. 31, pages 13 to 15 (1942).

Stock et al.: "Berichte," vol. 56, page 808 (1923).

Whatley et al.: J. Am. Chem. Soc., vol. 76, pp. 835–8 (1954).

TOBIAS E. LEVOW, *Primary Examiner.*

LEON D. ROSDOL, ROGER L. CAMPBELL,
*Examiners.*